US012625043B2

(12) United States Patent
Matsuki et al.

(10) Patent No.: US 12,625,043 B2
(45) Date of Patent: May 12, 2026

(54) DELAYED FRACTURE CHARACTERISTIC EVALUATION METHOD AND PROGRAM

(71) Applicant: JFE STEEL CORPORATION, Tokyo (JP)

(72) Inventors: Yuichi Matsuki, Tokyo (JP); Toyohisa Shinmiya, Tokyo (JP); Kinya Nakagawa, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 423 days.

(21) Appl. No.: 18/255,932

(22) PCT Filed: Jul. 29, 2021

(86) PCT No.: PCT/JP2021/028096
§ 371 (c)(1),
(2) Date: Jun. 5, 2023

(87) PCT Pub. No.: WO2022/118497
PCT Pub. Date: Jun. 9, 2022

(65) Prior Publication Data
US 2024/0044760 A1 Feb. 8, 2024

(30) Foreign Application Priority Data
Dec. 3, 2020 (JP) ................................. 2020-201289

(51) Int. Cl.
*G01N 3/20* (2006.01)
(52) U.S. Cl.
CPC ....... *G01N 3/20* (2013.01); *G01N 2203/0064* (2013.01); *G01N 2203/0067* (2013.01);
(Continued)

(58) Field of Classification Search
None
See application file for complete search history.

(56) References Cited

U.S. PATENT DOCUMENTS

| | | |
|---|---|---|
| 9,069,917 B2 | 6/2015 | Shimanuki |
| 2010/0131256 A1 | 5/2010 | Hallquist |
(Continued)

FOREIGN PATENT DOCUMENTS

| | | |
|---|---|---|
| CN | 1711365 A | 12/2005 |
| CN | 103890560 A | 6/2014 |
(Continued)

OTHER PUBLICATIONS

Machine translation of JP-6610607-B2 (Year: 2019).*
(Continued)

*Primary Examiner* — Matthew G Marini
(74) *Attorney, Agent, or Firm* — Oliff PLC

(57) ABSTRACT

To further enhance the evaluation accuracy of a delayed fracture. Focusing on the fact that a calculated stress value serving as the reference for the occurrence of the delayed fracture changes depending on analysis conditions of a forming analysis, a value obtained by changing a stress value serving as the reference for the occurrence of the delayed fracture according to the analysis conditions for analyzing an intended formed article (article for practical use) is used as the reference for evaluating the delayed fracture. For example, analysis conditions of a forming analysis in an evaluation test of the delayed fracture are matched with analysis conditions of a forming analysis of an article for practical use represented by an actual automobile component.

17 Claims, 10 Drawing Sheets

ENTIRELY PLANE STRAIN STATE

2D SOLID ELEMENT

(52) U.S. Cl.
CPC ................ *G01N 2203/0236* (2013.01); *G01N 2203/0282* (2013.01)

(56) References Cited

U.S. PATENT DOCUMENTS

| | | | |
|---|---|---|---|
| 2014/0350904 A1 | 11/2014 | Shimanuki | |
| 2016/0279739 A1* | 9/2016 | Kanasaki | ............... B23K 9/232 |
| 2019/0212236 A1 | 7/2019 | Aitoh et al. | |
| 2020/0276658 A1 | 9/2020 | Fujii et al. | |
| 2022/0220577 A1 | 7/2022 | Hirashima et al. | |

FOREIGN PATENT DOCUMENTS

| | | |
|---|---|---|
| CN | 111141612 A | 5/2020 |
| JP | H11-271211 A | 10/1999 |
| JP | 2005-205467 A | 8/2005 |
| JP | 2010-069533 A | 4/2010 |
| JP | 2010-071734 A | 4/2010 |
| JP | 2010-127933 A | 6/2010 |
| JP | 2011-203415 A | 10/2011 |
| JP | 2011-251651 A | 12/2011 |
| JP | 2012-033039 A | 2/2012 |
| JP | 2014-170318 A | 9/2014 |
| JP | 2015-004596 A | 1/2015 |
| JP | 2015-104745 A | 6/2015 |
| JP | 2016-046938 A | 4/2016 |
| JP | 2017-142086 A | 8/2017 |
| JP | 6330981 B1 | 5/2018 |
| JP | 2018-185183 A | 11/2018 |
| JP | 2018-185184 A | 11/2018 |
| JP | 2019-020332 A | 2/2019 |
| JP | 6610607 B2 | 11/2019 |
| WO | 2019/064922 A1 | 4/2019 |
| WO | 2020/230796 A1 | 11/2020 |

OTHER PUBLICATIONS

Oct. 5, 2021 Search Report issued in International Patent Application No. PCT/JP2021/028096.

May 30, 2023 International Preliminary Report on Patentability issued in International Patent Application No. PCT/JP2021/028096.

Nov. 30, 2021 Decision to Grant a Patent issued in Japanese Patent Application No. 2021-564238.

Mar. 15, 2024 Search Report issued in European Patent Application No. 21900254.0.

Aug. 16, 2025 Office Action issued in Chinese Patent Application No. 202180081453.X (with English Search Report).

* cited by examiner

FIG. 1A
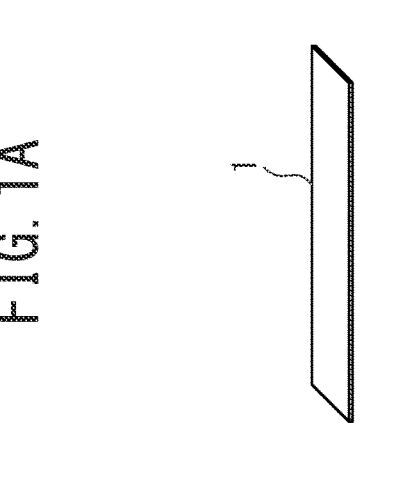
ENTIRELY PLANE STRAIN STATE →
2D SOLID ELEMENT
FIG. 1B
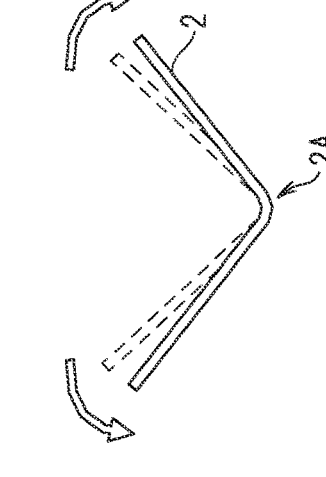
PUNCH
DIE
V-BENDING FORMING STEP
PLANE STRAIN STATE IN CENTER OF
SHEET WIDTH UNIAXIAL DEFORMATION
STATE IN END SURFACE →
3D SOLID ELEMENT
FIG. 1C
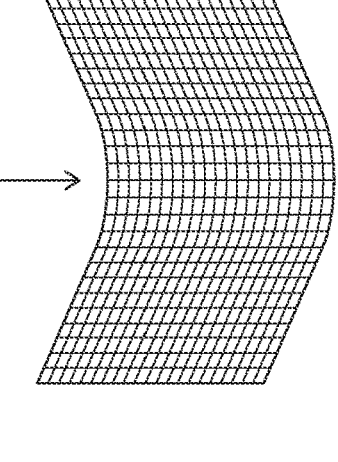
PLANE STRAIN STATE IN CENTER OF
SHEET WIDTH UNIAXIAL DEFORMATION
STATE IN END SURFACE →
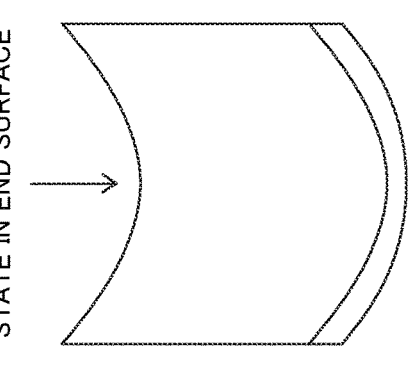
SHELL ELEMENT

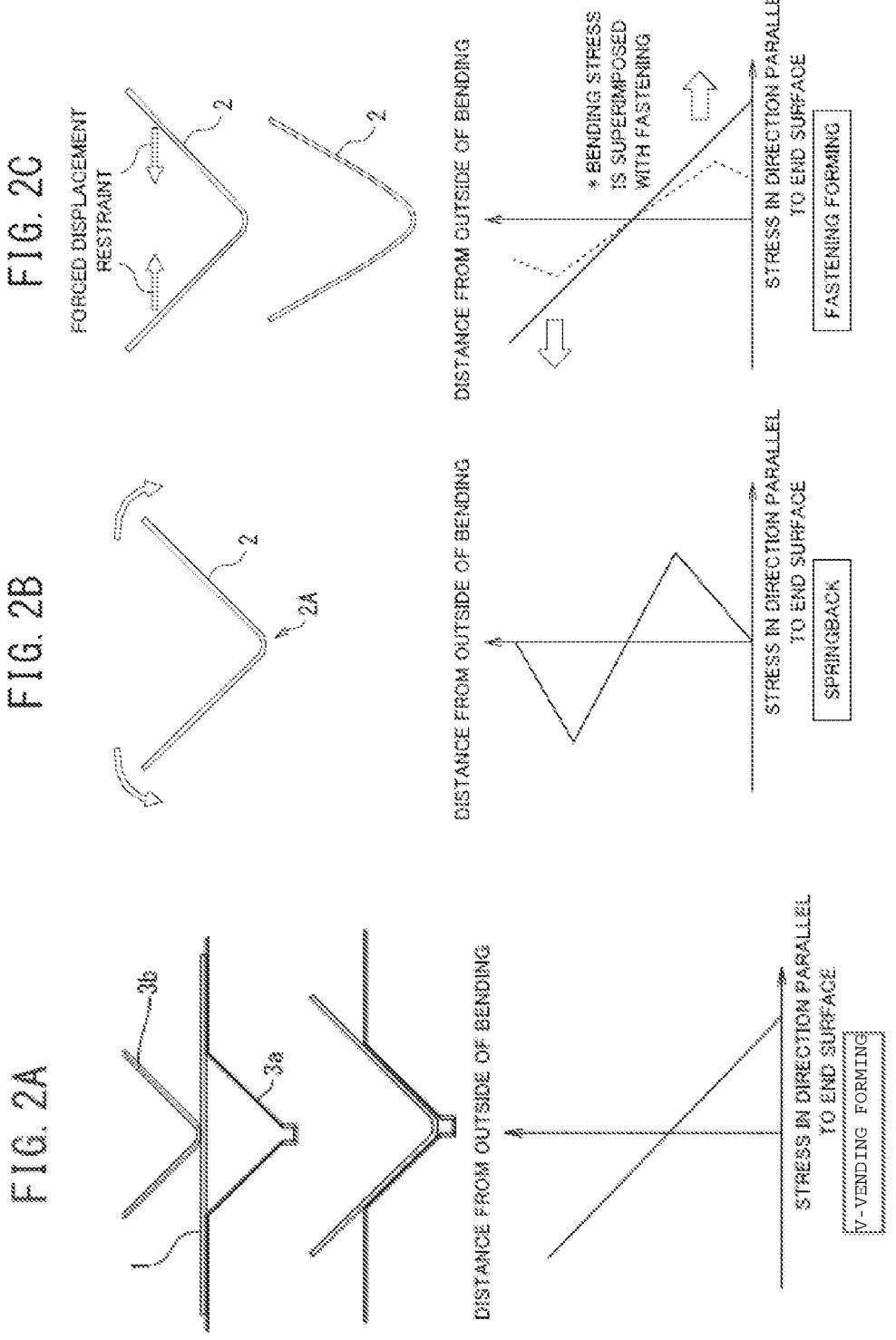

FIG. 3

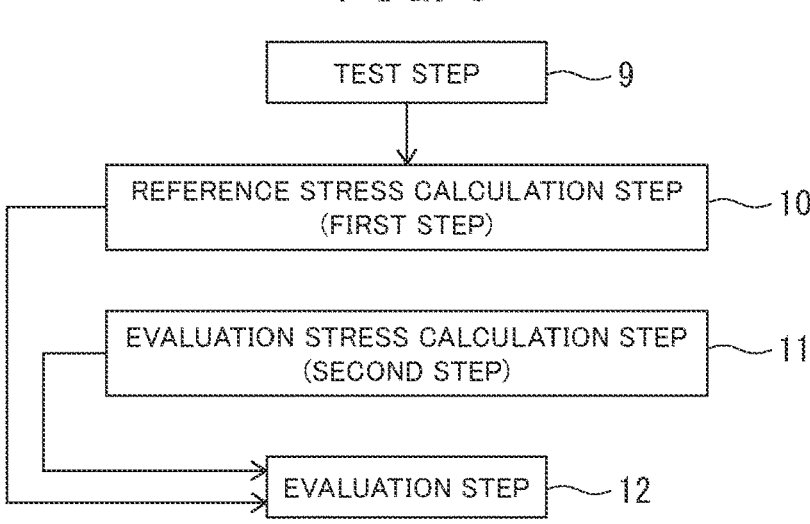

TEST STEP — 9

REFERENCE STRESS CALCULATION STEP
(FIRST STEP) — 10

EVALUATION STRESS CALCULATION STEP
(SECOND STEP) — 11

EVALUATION STEP — 12

FIG. 4

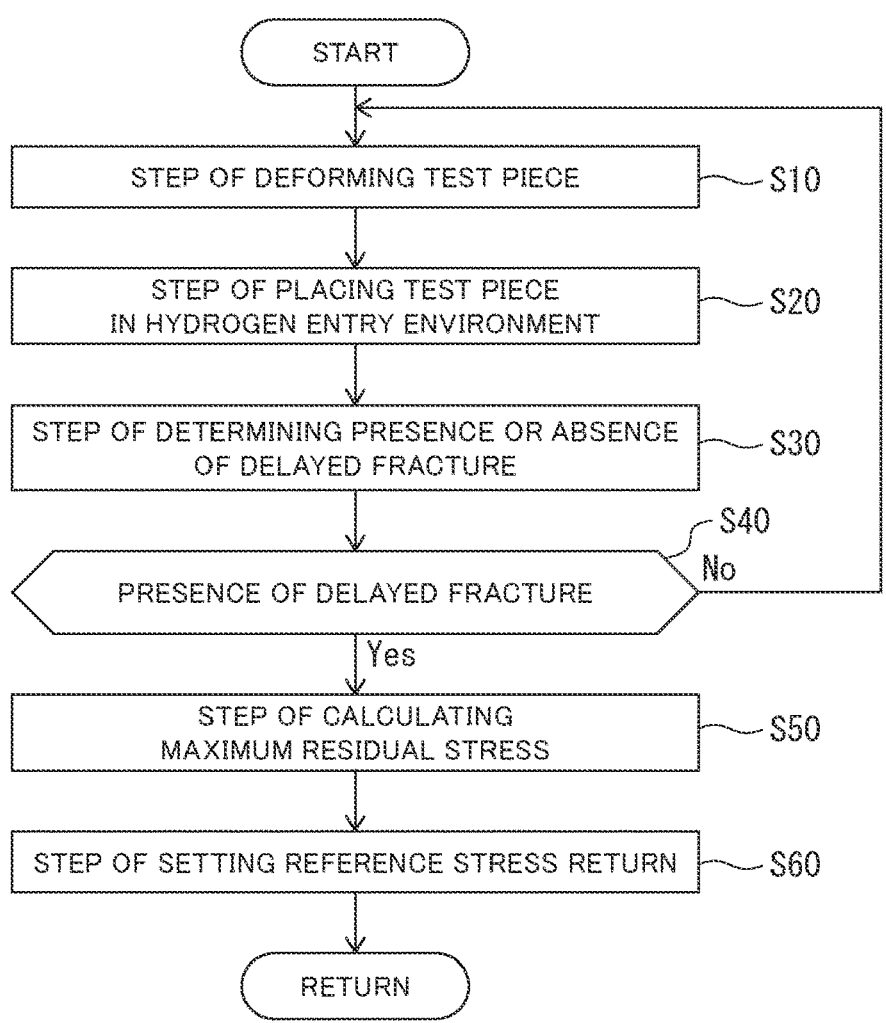

START

STEP OF DEFORMING TEST PIECE — S10

STEP OF PLACING TEST PIECE
IN HYDROGEN ENTRY ENVIRONMENT — S20

STEP OF DETERMINING PRESENCE OR ABSENCE
OF DELAYED FRACTURE — S30

PRESENCE OF DELAYED FRACTURE — S40 No

Yes

STEP OF CALCULATING
MAXIMUM RESIDUAL STRESS — S50

STEP OF SETTING REFERENCE STRESS RETURN — S60

RETURN

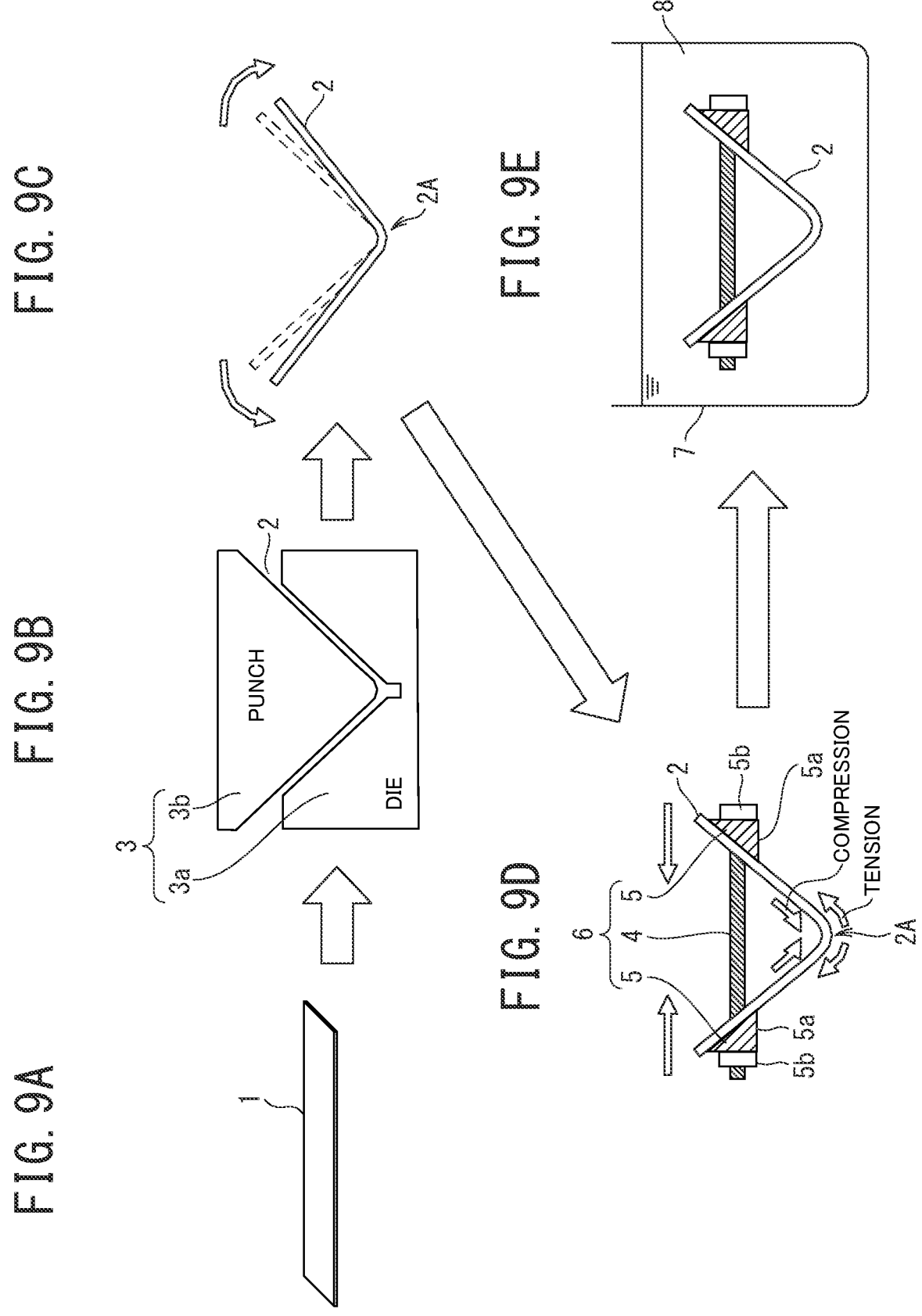

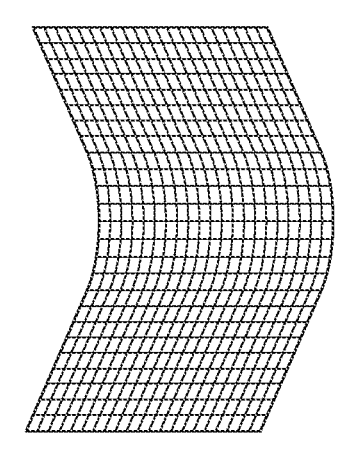
FIG. 10C
SHELL ELEMENT
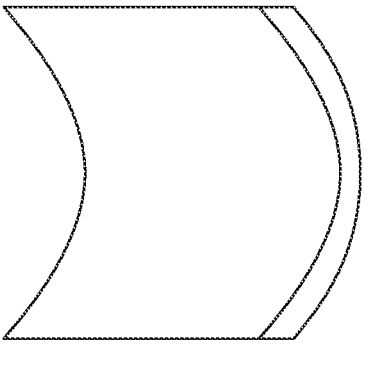
FIG. 10B
3D SOLID ELEMENT
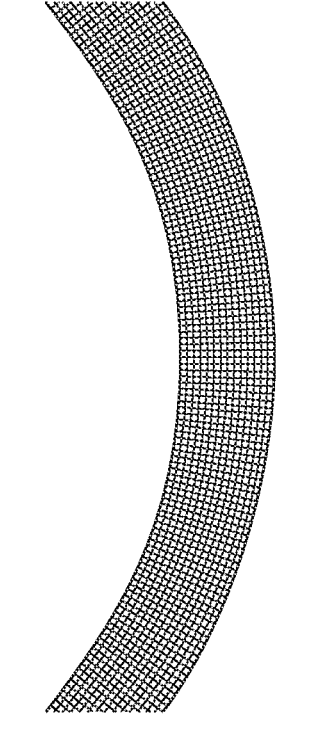
FIG. 10A
2D SOLID ELEMENT

FIG. 11A
TEST PIECE
FRONT SURFACE 1
SHEARING DIRECTION
BACK SURFACE
FIG. 11B
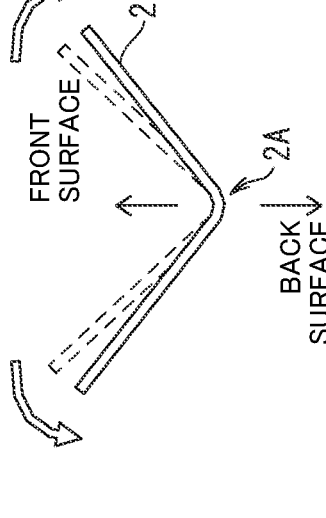
PUNCH
3 { 3a 3b
2
DIE
FIG. 11C
FRONT SURFACE
2
2A
BACK SURFACE
FIG. 11D
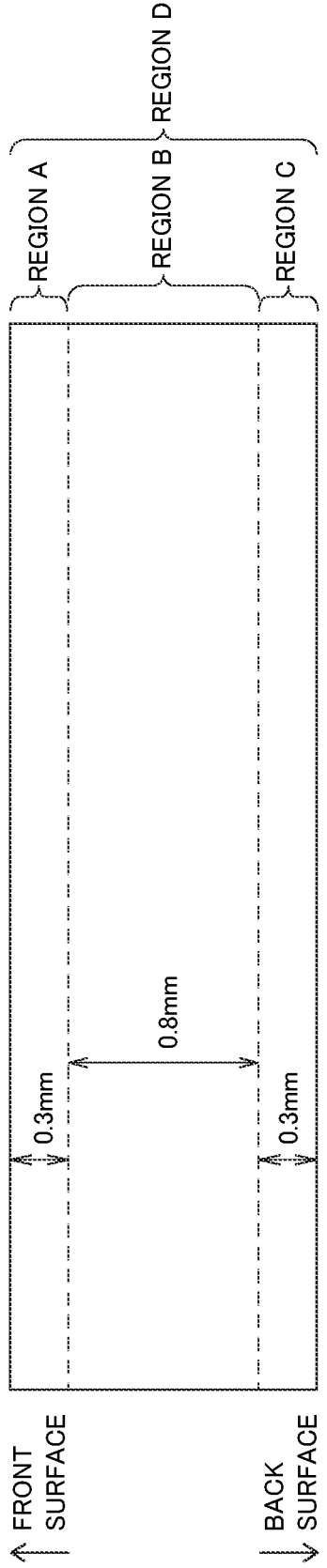
REGION A
REGION B · REGION D
REGION C
0.3mm
0.8mm
0.3mm
FRONT SURFACE
BACK SURFACE

DELAYED FRACTURE CHARACTERISTIC EVALUATION METHOD AND PROGRAM

TECHNICAL FIELD

The present invention is a technology related to a method for evaluating the characteristics of a delayed fracture occurring in a formed article after press forming of a metal sheet and a program used therefor. In particular, the present invention is a technology suitable for structural components of automobiles in which metal sheets contain high-tensile steel sheets. For example, the present invention is a technology suitable for evaluating the delayed fracture characteristics of flange end portions in press formed vehicle body structural members, such as center pillars and A-pillar lowers containing the high-tensile steel sheets.

BACKGROUND ART

At present, automobiles have been required to improve fuel consumption by a reduction in weight and collision safety. For the purpose of achieving both the reduction in weight of a vehicle body and the protection of passengers in the event of a collision, high-strength steel sheets are used for the vehicle body. Particularly in recent years, ultrahigh-strength steel sheets which are high-strength steel sheets having a tensile strength of 980 MPa or more have been applied to the vehicle body. As one of the problems when the ultrahigh-strength steel sheets are applied to the vehicle body, a delayed fracture is mentioned. The delayed fracture is a fracture phenomenon caused by a residual stress and a plastic strain after press forming and hydrogen entering from a hydrogen environment during use. Therefore, the application of high-tensile steel sheets to the vehicle body requires the evaluation of the delayed fracture characteristics according to press forming conditions and the prediction of the occurrence of the delayed fracture.

Conventional evaluation methods of the high-tensile steel sheets for press forming for automobiles include, for example, methods described in PTLs 1 to 3.

PTL 1 describes a method for evaluating the delayed fracture for a status where a test piece is V-bent, and then further a bending stress by fastening is applied. PTLs 2, 3 describe a method for evaluating the delayed fracture for a status where a tensile residual stress is applied after compressive deformation by deep drawing, stamping, or stamping drawing forming.

In all of these conventional findings, the stress generated in the test piece placed in the hydrogen environment is calculated. For example, a stress generated by the deformation applied to the test piece above by the forming is calculated by a simulation analysis by a computer (forming analysis).

CITATION LIST

Patent Literatures

PTL 1: JP 2017-142086 A
PTL 2: JP 2018-185184 A
PTL 3: JP 2018-185183 A

SUMMARY OF INVENTION

Technical Problem

The present inventors have examined the delayed fracture characteristics of the high-tensile steel sheets after press forming, and thus have obtained a finding that a calculated stress value in a simulation by a computer in a delayed fracture evaluation test depends on analysis conditions. The simulation by a computer is a forming analysis by the CAE, for example. The analysis conditions as used herein include an element type, an element size, a stress output location in a formed article, and an integration point position where the stress is output in a shell element in the forming analysis by the finite element method.

Therefore, even when the delayed fracture characteristics are evaluated by the evaluation methods described in PTLs above and a reference value of a stress serving as the limit of the occurrence of the delayed fracture (limit stress) is calculated, the following problems have arisen. More specifically, when the analysis conditions in calculating the reference value are different from the analysis conditions of the forming analysis for evaluating an actual formed article, there is a difference in the calculated values due to the difference in the analysis conditions. This has posed a problem that the accuracy of the delayed fracture evaluation may deteriorate corresponding to the difference.

Herein, as compared with the shape of a press formed article of the test piece, articles for practical are components having a large size and a complicated shape in many cases. Therefore, with respect to the articles for practical use, a forming analysis under analysis conditions of a small number of elements and a small computational load is adopted. On the other hand, the test piece is small and has a simple shape also after deformation. Therefore, there is a tendency to relatively increase the number of elements and relatively increase the computational load in the analysis condition when the reference value is calculated using the test piece. More specifically, there is a tendency to calculate a stress serving as the reference with high accuracy.

The reference value of the stress (reference stress) is a value determined by various delayed fracture evaluation methods, and is a limit value at which the delayed fracture occurs. Then, the reference value of the stress is applied to a calculation result of the forming analysis in an actual automobile component, and the occurrence of the delayed fracture is predicted in advance only from the forming analysis. This prediction is very important in the design of the vehicle body using the high-tensile steel sheets.

The present invention has been made in view of the above-described points. It is an object of the present invention to further enhance the evaluation accuracy of the delayed fracture.

Solution to Problem

The present invention focuses on the fact that the calculated stress value serving as the reference for the occurrence of the delayed fracture changes depending on the analysis conditions of the forming analysis. The present invention changes the stress value serving as the reference for the occurrence of the delayed fracture according to the analysis conditions applied in analyzing an intended formed article (article for practical use). One of the features of the present invention is that the changed value is used as the reference for the delayed fracture evaluation.

To solve the above-described problems, one aspect of the present invention matches analysis conditions of the forming analysis in an evaluation test of the delayed fracture with at least one of analysis conditions of practical forming analysis represented by the actual automobile component. For example, the analysis conditions of the forming analysis in the evaluation test of the delayed fracture are set to analysis conditions with a smaller computational load than before according to the analysis conditions of the practical forming analysis represented by the actual automobile component.

This makes it possible to eliminate or reduce a difference in the calculated stress values caused by the adopted analysis conditions between the forming analysis in the evaluation test of the delayed fracture and the forming analysis represented by the actual automobile component. As a result, the accuracy of the delayed fracture evaluation is enhanced by the use of the reference stress for the occurrence of the delayed fracture obtained from the evaluation test of the delayed fracture in comparison with the calculation result of the forming analysis in the actual automobile component.

According to another aspect of the present invention, the stress serving as the reference for the occurrence of the delayed fracture calculated by the forming analysis in the evaluation test of the delayed fracture is converted, based on analysis conditions of the practical forming analysis represented by the actual automobile component, to approach a value calculated under the analysis conditions. Then, the converted stress is used as a reference for the delayed fracture evaluation.

This makes it possible to reduce a labor of the calculation for matching the forming analysis conditions in the evaluation test of the delayed fracture above to the conditions of the practical forming analysis represented by the actual automobile component. Therefore, according to another aspect of the present invention, the stress value serving the reference for the occurrence of the delayed fracture is multiplied by a conversion factor for correcting the difference in the analysis conditions, so that the limit stress with a calculated value differing depending on the analysis conditions can be simply made to correspond to the actual automobile component.

Advantageous Effects of Invention

According to the aspects of the present invention, the delayed fracture characteristics are evaluated considering the difference depending on the analysis conditions of the forming analysis between a time of a test and a time of an actual evaluation. Therefore, the aspects of the present invention can further enhance the evaluation accuracy.

This makes it possible to apply the reference value of the stress serving as the limit of the occurrence of the delayed fracture determined by various delayed fracture evaluation methods to the calculation result of the forming analysis of the actual automobile component with high accuracy. This makes it possible to predict the occurrence of the delayed fracture in advance with high accuracy from the forming analysis. This contributes to the design of the vehicle bodies using the high-tensile steel sheets, and makes it possible to facilitate the application of the high-tensile steel sheets to automobiles.

BRIEF DESCRIPTION OF DRAWINGS

FIGS. 1A to 1C are explanatory views of element types, taking a test piece subjected to V-bending forming as an example;

FIGS. 2A to 2C are views for explaining stress distributions in the sheet thickness direction, taking V-bending forming and fastening forming from both end portions after the V-bending forming as examples, in which calculated stress values taking the V-bending forming and the fastening forming from both end portions after the V-bending forming as examples greatly change depending on output regions;

FIG. 3 is a view for explaining processing steps in a first embodiment;

FIG. 4 is a view for explaining processing of a reference stress calculation step;

FIGS. 9A to 9E are explanatory views of a jig used for experiments of V-bending forming and fastening forming;

FIGS. 10A to 10C are views illustrating the appearance on the CAE of each of a 2D solid element, a 3D solid element, and a shell element;

FIGS. 11A to 11D are explanatory views of A, B, C, D regions, which are regions where calculated stress values are output in the sheet thickness in Examples;

DESCRIPTION OF EMBODIMENTS

Figure 5:
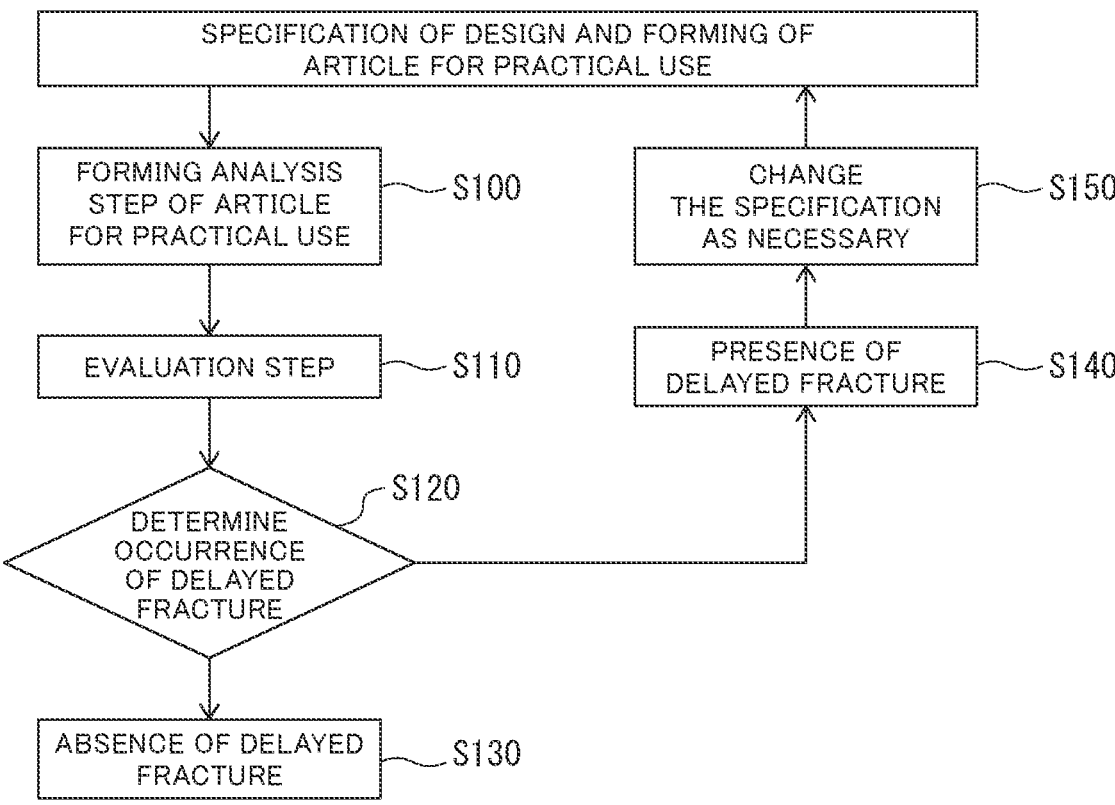
FIG. 5 is a view for explaining evaluation processing of an article for practical use.

Embodiments of the present invention are described with reference to the drawings.

A case is assumed in which a residual stress generated in a press formed article when a metal sheet is formed into the press formed article is calculated by a forming analysis by a computer. In this case, even when forming conditions of the press forming are the same, a calculated stress value depends on analysis conditions, which poses a problem that the calculated stress value differs depending on the adopted analysis conditions.

Herein, a forming analysis by the finite element method is usually used for the forming analysis of the press forming. The analysis conditions thereof include a condition having a large effect particularly on a calculated stress value. The conditions having a large effect include, in the forming analysis by the finite element method, an element type, an element size, a stress output location in a formed article, and an integration point position where the stress is output in a shell element.

The types and the sizes of elements in the forming analysis by the finite element method are described in Examples of PTL 1, for example. In Examples thereof, a two-dimensional solid element (or a plane strain element) is described which assumes a plane strain state for a forming analysis of bending. Further, PTL 1 describes that it is desirable to perform the analysis with a three-dimensional solid element when there is sufficient computing power.

On the other hand, in a forming analysis of an actual automobile component, when the component is large, it is difficult to select a three-dimensional solid element having an excessive large number of elements because the computing power is limited. Further, unlike simple bending forming as in PTL 1, there is a necessity of performing a forming analysis of the entire complicated component. Therefore, in the forming analysis of the actual automobile component, it is also not preferable to perform a simplified analysis using the two-dimensional solid element.

Therefore, as the element type frequently used in the forming analysis of the actual automobile component, a shell element, which have a small number of elements, a small computational load, and no constraint conditions, tends to be adopted.

As described above, the shell element tends to be used in the forming analysis of the actual automobile component. The delayed fracture tends to occur from component end portions, and therefore an evaluation in the component end portions is important.

The prediction of the occurrence of the delayed fracture using calculated values in the two-dimensional solid element is less accurate than that in the prediction based on residual stress values in component end surface portions of the shell element. The reason therefor is as follows. The two-dimensional solid element assumes the plane strain condition. On the other hand, the deformation state of the end surface of the shell element is in a uniaxial deformation state because there is no constraint of the surrounding material.

Therefore, in the shell element, stress values are significantly different at the same strain. Thus, the use of the two-dimensional solid element deteriorates the accuracy.

FIG. 1 illustrates the three element types, taking a case of a V-bending forming test piece as an example.

At this time, the stress output location in the two-dimensional solid element and the integration point position where the stress is output in the shell element also greatly affect the calculated stress value. For example, in Examples of PTL 1, a calculated residual stress value is evaluated for a mesh of the outermost surface layer on the outside of the bending in the two-dimensional solid element.

On the other hand, to predict the delayed fracture occurring from the end surface portions, it is originally preferable to consider residual stresses in all regions (all output points) in the sheet thickness direction of the end surface. Therefore, from that viewpoint, the selection of the integration point where the stress is calculated is required even in the shell element.

However, the residual stress is not necessarily maximum on the front surface side on the outside of the bending. In actual, the end surface portion has a complicated stress distribution in the sheet thickness direction depending on a time of forming, a time of springback, and the other forming conditions. Therefore, the stress serving as the reference for the delayed fracture greatly changes depending on which of the integration points is selected for outputting the calculated stress value.

This applies to any element type. The calculated stress value greatly changes depending on a manner of selecting a region where the calculated value is output. FIGS. 2A and 2C illustrates stress distributions in the sheet thickness direction, taking the V-bending forming and the fastening deformation, respectively, from both end portions after the V-bending forming as examples.

As described above, even when the delayed fracture characteristics are evaluated by the evaluation method as in the prior art, and a reference value of the stress serving as the limit at which the delayed fracture occurs is calculated by the forming analysis, the accuracy correspondingly deteriorates. More specifically, when there is a difference in the analysis conditions of the forming analysis, the accuracy correspondingly deteriorates in the case of predicting the occurrence of the delayed fracture by applying the reference value of the stress serving as the limit of the occurrence of the delayed fracture to a calculation result of the forming analysis of the actual automobile component.

On the other hand, in a first embodiment of the present invention, first analysis conditions of the forming analysis used when the reference value of the stress is obtained are set to the same conditions as one or more conditions of second analysis conditions. The second analysis conditions are analysis conditions of a forming analysis used for calculating a stress generated in the forming of the shapes of articles for practical use.

Herein, it is conceivable to change the second analysis conditions to be equal to the first analysis conditions. However, the setting of the first analysis conditions has a larger degree of freedom. Therefore, it is preferable to match the first analysis conditions with the second analysis conditions. In the first embodiment, at least the conditions of the element type and the element size among first analysis conditions are set to the same conditions as the conditions of the element type and the element size of the second analysis conditions.

In a second embodiment of the present invention, a conversion factor is determined to bring the stress value calculated under the first analysis conditions closer to the stress value calculated under the second analysis conditions. Then, the reference stress calculated using the first analysis conditions are converted by the conversion factor, and the converted stress is used as the reference stress for the evaluation.

Hereinafter, the embodiments are described in further detail.

First Embodiment (Configuration)

A delayed fracture method of this embodiment includes at least a test step 9, a reference stress calculation step 10, an evaluation stress calculation step 11, and an evaluation step 12 as illustrated in FIG. 3.

The reference stress calculation step 10 and the evaluation stress calculation step 11 constitute a first step and a second step, respectively.

The test step 9 performs processing of applying a deformation to a test piece 1 containing a metal sheet. The test step 9 places the deformed test piece 2 in a hydrogen entry environment, and evaluates the generation status of cracks generated in the test piece 2 by the placement.

The reference stress calculation step 10 inputs information about the above-described deformation determined to have the delayed fracture based on the evaluation in the test step 9. Based on the input, the reference stress calculation step 10 calculates the maximum residual stress generated in the test piece after the deformation by applying the deformation to the test piece by the forming analysis under the first analysis conditions by a computer. The reference stress calculation step 10 determines the reference stress from the calculated maximum residual stress. The reference stress is used for determining whether the delayed fracture occurs in a formed article of the metal sheet in a hydrogen environment.

The evaluation stress calculation step 11 performs the forming analysis under the second analysis conditions by the computer for the shape of the formed article (press component) designed as an article for practical use. Then, the evaluation stress calculation step 11 determines the residual stress generated in the formed article by forming the metal sheet into an intended formed article. Residual stresses are determined in a plurality of locations in the formed article.

The residual stress to be evaluated may be represented by the maximum residual stress of the determined residual stresses.

The evaluation step 12 evaluates the delayed fracture characteristics of the intended formed article from a comparison between the residual stress and the reference stress determined in the second step.

Herein, in the first embodiment described above, the first analysis conditions adopted in the reference stress calculation step 10 are set to the same analysis conditions as the second analysis conditions adopted in the evaluation stress calculation step 11. In this embodiment, at least the conditions of the element type and the element size among the first analysis conditions are set to the same conditions as the conditions of the element type and the element size of the second analysis conditions. All of the analysis conditions set as the first analysis conditions may be set to the same conditions as the second analysis conditions.

<Test Step 9 and Reference Stress Calculation Step 10>

The test step 9 and the reference stress calculation step 10 are carried out by the processing illustrated in FIG. 4, for example.

First, Step S10 produces a test piece after deformation.

This step prepares a metal sheet (for example, high-tensile steel sheet) formed of the same material and having the same thickness as the material and the thickness of a product to be manufactured is prepared. More specifically, the same metal sheet as a metal sheet used for the product is prepared. Then, the metal sheet is sheared to produce the test piece 1 having a predetermined shape. Next, a deformation of a preset deformation amount is given to the test piece by a preset forming method.

Examples of the forming method include V-bending, deep drawing, and the like as described in PTLs 1 to 3. In this embodiment, any known forming method may be adopted as the forming method to be used. Thus, in the case of the V-bending, for example, a strain and a residual stress simulating press forming are applied to a bending portion 2A. In the case of the deep drawing, a strain and a residual stress simulating press forming are applied to an end portion, such as a flange portion.

Herein, it is preferable to prepare a plurality of test pieces having different deformation amounts at the same time.

Next, Step S20 places the test piece 1 produced in Step S10 in the hydrogen entry environment (hydrogen entry atmosphere).

The placement of the test piece in the hydrogen entry environment is carried out by, for example, immersing the formed test piece in a bath containing an acid solution, such as hydrochloric acid or an aqueous $NH_4SCN$ solution.

Next, Step S30 evaluates a delayed fracture property based on the crack generation status (for example, time until the occurrence) at a position where a strain is applied of the test piece.

For example, Step S30 evaluates the delayed fracture property of the metal sheet based on the crack generation status (e.g., time until the crack generation) at the position where a strain is applied in the test piece placed for a predetermined period of time in the hydrogen entry environment.

Next, when Step S40 determines that the test piece evaluated in Step S30 has the delayed fracture, the process proceeds to Step S50. When there is no test piece with the delayed fracture, the setting is performed such that the deformation amount increases, the process returns to Step S10, and then processing from Steps S10 to S40 is carried out. The test pieces with different deformation amounts can also be evaluated at the same time.

Herein, the processing from Steps S10 to S40 corresponds to the test step 9.

Step S50 carries out the forming analysis under the first analysis condition by a computer based on the deformation amount of the test piece having the smallest deformation amount among the test pieces determined to have the delayed fracture, and calculates the maximum tensile residual stress.

Herein, the forming conditions in the forming analysis are conditions in which the processing method used in Step S10 is used and the deformation amount in the processing is set to the deformation amount of the test piece.

In this embodiment, the first analysis conditions are determined according to the second analysis conditions. In this embodiment, the first analysis conditions are set to the same conditions as the second analysis conditions.

Step S60 sets the maximum tensile residual stress calculated in Step S50 as the reference stress. However, the reference stress does not have to be matched with the maximum tensile residual stress. For example, a value smaller than the maximum tensile residual stress calculated above by a preset allowance may be set as the reference stress.

Steps S50, S60 correspond to the first step (reference stress calculation step 10) carried out by a computer.

This reference stress serves as a reference value for determining whether the delayed fracture occurs in a press formed article when a metal sheet is press formed or as a reference for determining the degree of allowance for the occurrence of the delayed fracture.

The processing above is processing for determining the reference stress for the delayed fracture evaluation.

<Evaluation Processing>

Next, evaluation processing of an article for practical use, which is the intended formed article, is described with reference to FIG. 5.

First, the shape of the formed article as a candidate for the article for practical use is determined based on a specification.

Then, Step S100 subjects the shape of the formed article (the shape of the article for practical use) to the forming analysis under the second analysis conditions by the computer. Then, when a metal sheet is formed into the shape of the formed article above, the residual stress at each position generated in an end portion of the intended formed article is calculated.

As the forming conditions in the forming analysis, press working conditions in forming the article for practical use are set.

This Step S100 corresponds to the evaluation stress calculation step 11 (second step).

Next, the process shifts to Step 110-S110. Step 110-S110 compares each residual stress obtained in Step S100 with the reference stress above, and evaluates whether each residual stress is less than the reference stress.

The processing of Step S110 corresponds to the evaluation step 12.

Then, Step S120 evaluates (predicts) that the delayed fracture has occurred when any of the residual stresses is equal to or larger than the reference stress. Then, the process proceeds to Step S140. On the other hand, when all of the residual stresses are less than the reference stress, Step S120 determines that the delayed fracture of a predetermined level or more has not occurred. Then, the process proceeds to Step S130. The maximum residual stress of the residual stress at each position may be used as a representative for evaluation.

Step S130 outputs the evaluation that the delayed fracture has not occurred in the set shape of the formed article.

On the other hand, Step S140 evaluates that the delayed fracture has occurred. Then, the process proceeds to Step S150.

Step S150 changes the specification as necessary. Then, the shape of the formed article as a candidate for the article for practical use is determined again based on the changed specification, and the process proceeds to Step S100, so that the processing above is repeated.

Software Configuration Example

In this embodiment, the processing of the reference stress calculation step 10 constituting the first step, the evaluation stress calculation step 11 constituting the second step, and the evaluation step 12 are carried out by a computer. The processing of the evaluation step 12 does not have to be carried out by a computer.

Figure 6:
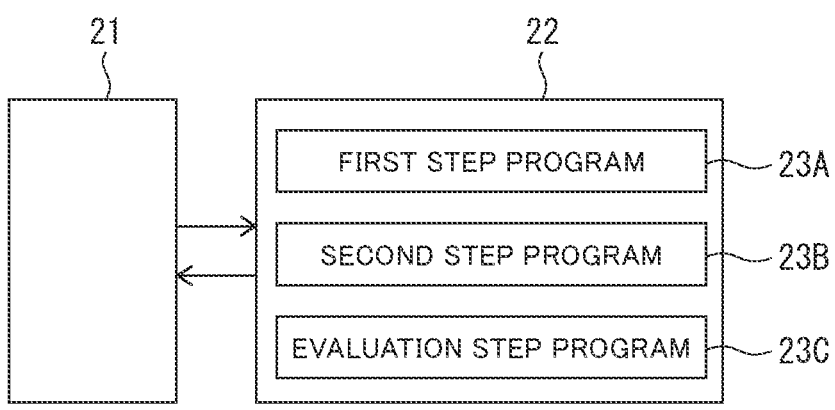
FIG. 6 is a view illustrating the software configuration in the first embodiment.

In this embodiment, a first step program 23A, a second step program 23B, and an evaluation step program 23C are stored in a program storage unit 22 as illustrated in FIG. 6, for example. The reference numeral 21 designates a computer having a CPU and other hardware configurations, and the computer executes the programs stored in the program storage unit 22.

The first step program 23A is a program for carrying out the processing of the first step above. The first step program 23A has, for example, a first forming analysis unit by the CAE calculating the maximum residual stress and a reference stress setting unit determining the reference stress from the maximum residual stress calculated by the first forming analysis unit.

The second step program 23B is a program for carrying out the processing of the second step above. The second step program 23B has, for example, a second forming analysis unit by the CAE calculating the residual stress.

The evaluation step program 23C is a program for carrying out the processing of the evaluation step 12 above. The evaluation step program 23C carries out processing of comparing the reference stress determined in the first step program 23A with the residual stress determined in the second step program 23B.

In this embodiment, the conditions of the element type and the element size among the analysis conditions of the forming analysis used in the first forming analysis unit are set to the same conditions as the conditions of the element type and the element size of the analysis conditions of the forming analysis used in the second forming analysis unit.

(Operations and Others)

This embodiment provides processing suitable when the metal sheet to be evaluated is the high-tensile steel sheet having a tensile strength of 980 MPa or more and is also suitable for the evaluation of automobile components.

This embodiment evaluates the delayed fracture characteristics by determining whether cracks due to the delayed fracture are generated in the formed article containing the metal sheet, such as the high-tensile steel sheet, in the hydrogen environment. At this time, experiments and forming analyses using test pieces determine the reference stress serving as the reference for the evaluation of the delayed fracture characteristics. At this time, in this embodiment, the first analysis conditions of the forming analysis are set to the same analysis conditions as the second analysis conditions adopted in the forming analysis in the design of the article for practical use.

Herein, the calculated stress value by the forming analysis differs depending on the adopted analysis conditions. Therefore, the stress serving as the reference for the occurrence of the delayed fracture changes depending on the analysis conditions. Therefore, in this embodiment, processing is performed assuming that the stress value serving as the reference for the occurrence of the delayed fracture changes depending on the second analysis conditions.

The stress serving as the reference for the occurrence of the delayed fracture is preferably treated as one changing depending on the strain similarly calculated under the analysis conditions above. This is because, as described in PTLs 1 to 3, the strain due to the processing affects the occurrence of the delayed fracture in some cases, and therefore, it is assumed that the stress serving as the reference for the occurrence of the delayed fracture changes in some cases. The strain as used herein refers to an equivalent plastic strain, for example.

All of the forming analyses used in this embodiment are performed by the finite element method.

The analysis conditions to be matched in the first analysis conditions and the second analysis conditions preferably include the element type and the element size in the forming analysis by the finite element method. Further, both the analysis conditions may be matched also with respect to the stress output location in the formed article and the integration point position where the stress is output in the shell element.

Herein, the delayed fracture can occur from any location in the sheet thickness in the end surface of the formed article. Therefore, the maximum stress of all of the elements or the integration points in the sheet thickness are preferably output with respect to the calculation positions of the residual stress in the second analysis conditions. The calculation positions of the residual stress are the stress output location in the formed article to be analyzed and the integration point position where the stress is output in the shell element.

Then, in this embodiment, between the processing of determining the reference stress for the evaluation of the delayed fracture and the forming analysis in the intended formed article representing the actual automobile component, a difference in the calculated stress values generated by the analysis conditions can be reduced. Then, in this embodiment, the reference stress for the occurrence of the delayed fracture determined with high accuracy is compared with the calculation result of the forming analysis in the intended formed article representing the actual automobile component. By this comparison, the occurrence of the delayed fracture is predicted. Then, based on the prediction result of the occurrence of the delayed fracture, the specifications of the design and the forming are appropriately changed for the intended formed article. As a result, the delayed fracture can be avoided for press formed articles to be actually manufactured.

Second Embodiment

Next, the second embodiment is described.

The basic configuration of the second embodiment is similar to the basic configuration of the first embodiment.

Figure 7:
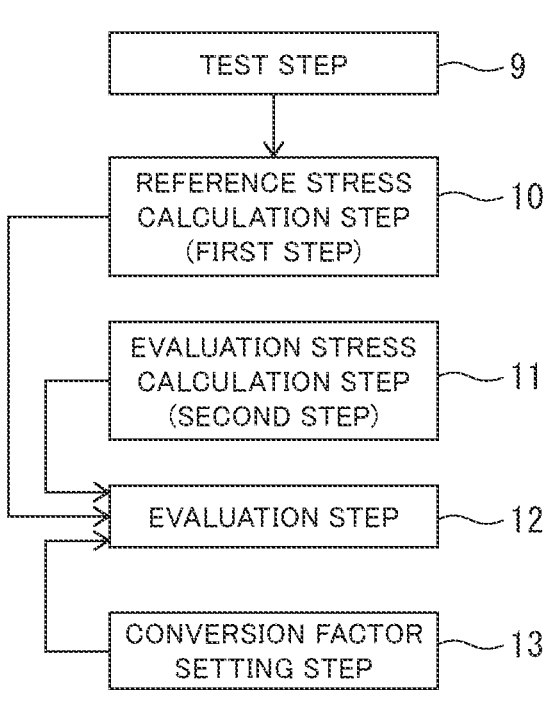
FIG. 7 is a view for explaining processing steps in a second embodiment.

The second embodiment is different from the first embodiment in that, as illustrated in FIG. 7, the second embodiment separately has a conversion factor setting step 13 and that a conversion factor set by the conversion factor setting step 13 is used in the evaluation step 12. The others are the same as those in the first embodiment, and therefore a description is omitted.

(Configuration)

<Conversion Factor Setting Step 13>

The conversion factor setting step 13 corresponds to a third step.

The conversion factor setting step 13 determines the correlation between a first stress calculated by the forming analysis under the first analysis conditions and a second stress calculated by the forming analysis under the second analysis condition when a metal sheet is press formed under the same forming condition, for example. The conversion factor setting step 13 calculates, from the determined correlation, a conversion factor for bringing the stress calculated by the forming analysis under the first analysis conditions closer to the stress calculated by the forming analysis under the second analysis conditions above. The metal sheet in determining the conversion factor may be different from the metal sheet for evaluation.

For example, pressure calculation under the first analysis conditions and the second analysis conditions under the same forming condition is carried out a plurality of times. Further, statistical processing based on the calculations carried out a plurality of times determines the correlation between the pressure calculated under the first analysis conditions and the pressure calculated under the second analysis conditions. Then, the conversion factor is set from the correlation.

At this time, the correlation may be determined using the analysis condition, which is likely to have a significant effect on the calculated stress value, as a variable. For example, a generic conversion factor may be determined in which the element type and the mesh dimension are set as variables.

The element type is set to a 2D solid element, a 3D solid element or a shell element.

[Case where the Element Type of the Second Analysis Conditions is the Shell Element.]

Next, an example of the conversion factor when the element type of the second analysis conditions is the shell element is described.

In this case, a conversion factor K for converting a stress $\sigma 0$ calculated by the forming analysis under the first analysis conditions into a stress $\sigma$ calculated by the forming analysis under the second analysis conditions can be determined by Equation (1) below.

$$K=\alpha[\beta(m/t)+1] \tag{1}$$

Herein, t [mm] is the sheet thickness of the metal sheet before the forming. m [mm] is the mesh size of the element used for the forming analyses under the second analysis conditions and the first analysis conditions.

$\alpha$ and $\beta$ are preset coefficients.

Specifically, the coefficient $\alpha$ is set to a constant selected from the range of 0.7 to 0.9 when the element type of the first analysis conditions is the 2D solid element. The coefficient $\alpha$ is set to 1 when the element type of the first analysis conditions is the 3D solid element or the shell element.

The coefficient $\beta$ is set to a constant selected from the range of 0.05 to 0.15.

[Case where the Element Type of the First Analysis Conditions is the Shell Element.]

Next, an example of the conversion factor when the element type of the first analysis conditions is the shell element is described.

In this case, the conversion factor K for converting the stress $\sigma 0$ calculated by the forming analysis under the first analysis conditions into the stress $\sigma$ calculated by the forming analysis under the second analysis conditions can be obtained by Equation (2) below.

$$K=1/(\alpha[\beta(m/t)+1]) \tag{2}$$

Herein, t [mm] is the sheet thickness of the metal sheet before the forming. m [mm] is the mesh size of the element used for the forming analyses under the second analysis conditions and the first analysis conditions.

$\alpha$ and $\beta$ are preset coefficients.

Specifically, the coefficient $\alpha$ is set to a constant selected from the range of 0.7 to 0.9 when the element type of the second analysis conditions is the 2D solid element. The coefficient $\alpha$ is set to 1 when the element type of the second analysis conditions is the 3D solid element or the shell element.

The coefficient $\beta$ is set to a constant selected from the range of 0.05 to 0.15.

<Evaluation Step 12>

The evaluation step 12 of the second embodiment evaluates the delayed fracture characteristics of the intended formed article above. The evaluation is performed by comparing the residual stress determined in the evaluation stress calculation step 11 (second step) with the stress after converting the reference stress determined in the reference stress calculation step 10 by the conversion factor.

The conversion by the conversion factor is performed by the following equation, for example.

$$\sigma=K\cdot\sigma 0$$

Herein, the calculation of the stress after converting the reference stress by the conversion factor K may be carried out in the reference stress calculation step 10.

Software Configuration Example

In this embodiment, the reference stress calculation step 10 constituting the first step, the evaluation stress calculation step 11 constituting the second step, the conversion factor setting step 13 constituting the third step, and the evaluation step 12 are carried out by a computer. The processing of the evaluation step 12 does not have to be carried out by a computer.

Figure 8:
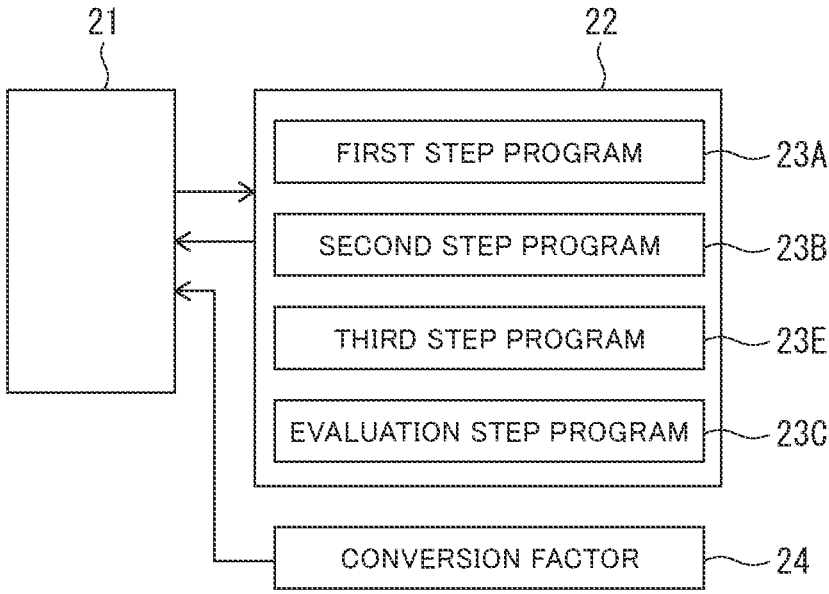
FIG. 8 is a view illustrating the software configuration in the second embodiment.

In this embodiment, the first step program 23A, the second step program 23B, the third step program 23E, and the evaluation step program 23C are stored in the program storage unit 22 as illustrated in FIG. 8, for example. The reference numeral 21 designates the computer having the CPU and other hardware configurations, and the computer executes the programs stored in the program storage unit 22.

The first step program 23A is the program for carrying out the processing of the first step above. The first step program 23A has, for example, the first forming analysis unit by the CAE calculating the maximum residual stress and a reference stress setting unit determining the reference stress from the maximum residual stress calculated by the first forming analysis unit.

The second step program 23B is the program for carrying out the processing of the second step above. The second step program 23B has, for example, the second forming analysis unit by the CAE calculating the residual stress.

The third step program 23E carries out processing of determining the conversion factor from the correlation between the first stress calculated by the forming analysis under the first analysis conditions and the second stress calculated by the forming analysis under the second analysis conditions when press forming is performed under the same forming condition. The conversion factor is a conversion factor for bringing the stress calculated by the forming analysis under the first analysis conditions closer to the stress calculated by the forming analysis under the second analysis conditions.

The third step program 23E may carry out the processing of calculating the conversion factor each time the program is started. The following processing configuration may be acceptable. More specifically, for example, a conversion factor 24 determined in advance is stored in a database for each analysis condition with the first analysis conditions and the second analysis conditions as variables. Then, the third step program 23E carries out processing of acquiring, from the database, the conversion factors corresponding to the first analysis conditions and the second analysis conditions used.

The evaluation step program 23C is a program for carrying out the processing of the evaluation step 12 above. The evaluation step program 23C multiplies the reference stress determined in the first step program 23A by the conversion factor determined in the third step program 23E for conversion. Further, the evaluation step program 23C carries out processing of comparing the reference stress after the conversion with the residual stress determined in the second step program 23B.

(Operations and Others)

In this embodiment, one of the objects is to reduce a labor of matching the first analysis conditions and the second analysis conditions. Therefore, in this embodiment, the reference stress for the delayed fracture obtained under the first analysis conditions is corrected by the conversion factor as a method capable of simply making the conditions correspond to each other.

The analysis conditions having a large effect on the calculated stress value serving as the reference for the delayed fracture include the element type and the mesh size of the element used for the forming analysis. Therefore, the conversion factor may be determined using at least one of the element type and the mesh size of the element of the first analysis conditions and the second analysis conditions as a variable. The correlation between the calculation results of the first analysis conditions and the second analysis conditions hardly depends on the type of metal sheet, and therefore may be determined in advance regardless of the type of the metal sheet to be subjected to press working.

Herein, as the optimum values for the coefficients, the coefficient $\alpha$ is set to 0.8 for the 2D solid element and set to 1 for the 3D solid element and the shell element. The coefficient $\beta$ is set to 0.1.

However, for the coefficient $\alpha$, a value between 0.7 and 0.9 for the 2D solid element is sufficiently accurate for simple calculations. For the coefficient $\beta$, a value between 0.05 and 0.15 is sufficiently accurate for simple calculations. The coefficient $\alpha$ is the plane strain deformation state in the 2D solid element as compared with the uniaxial tensile deformation state in the end surfaces of the 3D solid element and the shell element. Therefore, the coefficient $\alpha$ compensates for the fact that the stress for the same deformation state is calculated to be higher in 2D solids. As for the coefficient $\beta$, the finer the mesh, the more accurately the stress concentration is calculated. Therefore, the coefficient $\beta$ compensates for the fact that the stress is calculated to be higher even in the same deformation state.

(Others)

The present disclosure can also take the following configurations.

(1) This embodiment includes: a first step of applying a deformation to a test piece containing a metal sheet, evaluating the generation status of a crack generated in the test piece by placing the deformed test piece in a hydrogen entry environment, calculating, for the deformation determined to have a delayed fracture based on the evaluation, the maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment; a second step of determining a residual stress generated in the formed article by forming the metal sheet into an intended formed article by a forming analysis under second analysis conditions by the computer; and an evaluation step 12 of evaluating the delayed fracture characteristics of the intended formed article from a comparison between the residual stress determined in the second step and the reference stress; in which the conditions of an element type and an element size among the first analysis conditions are set to the same conditions as the conditions of an element type and an element size of the second analysis conditions.

According to this configuration, the delayed fracture characteristics are evaluated considering a difference depending on the analysis conditions of the forming analysis between the time of a test and the time of an actual evaluation. Therefore, the evaluation accuracy can be further enhanced.

(2) This embodiment includes: a first step of applying a deformation to a test piece containing a metal sheet, evaluating the generation status of a crack generated in the test piece by placing the deformed test piece in a hydrogen entry environment, calculating, for the deformation determined to have a delayed fracture based on the evaluation, the maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment; a second step of determining a residual stress generated in the formed article by forming the metal sheet into an intended formed article by a forming analysis under second analysis conditions by the computer; a third step of determining, from a correlation between a first stress calculated by the forming analysis under the first analysis conditions and a second stress calculated by the forming analysis under the second analysis conditions when press forming is performed under the same forming condition, a conversion factor for bringing the stress calculated by the forming analysis under the first analysis conditions closer to the stress calculated by the forming analysis under the second analysis conditions; and an evaluation step 12 of evaluating the delayed fracture characteristics of the intended formed article from a comparison between the residual stress determined in the second step and a stress after converting the reference stress by the conversion factor.

According to this configuration, the delayed fracture characteristics are evaluated considering a difference depending on the analysis conditions of the forming analysis between the time of a test and the time of an actual evaluation. Therefore, the evaluation accuracy can be further enhanced.

(3) The forming analysis is a forming analysis by the finite element method, and the first analysis conditions and the second analysis conditions include one or more conditions selected from the element type, the element size, a stress output location in the formed article, and an integration point position where the stress is output in a shell element.

(4) The first analysis conditions and the second analysis conditions include an element type, and the conversion factor is set based on a difference between the element types of the first analysis conditions and the second analysis conditions.

(5) The sheet thickness of the metal sheet before the forming is set to t [mm], the element type is set to a 2D solid element, a 3D solid element, or a shell element, the second analysis conditions are that the element type is the shell element and the mesh size of an element used for the forming analysis is m [mm], the mesh size of the element in the first analysis conditions is m [mm], and the conversion factor K for converting the stress calculated by the forming analysis under the first analysis conditions into the stress calculated by the forming analysis under the second analysis conditions is expressed by Equation (1) below, $$K=\alpha[\beta(m/t)+1] \tag{1}.$$

The coefficient $\alpha$ is set to a constant selected from the range of 0.7 to 0.9 when the element type of the first analysis conditions is the 2D solid element, and is set to 1 when the element type of the first analysis conditions is the 3D solid element or the shell element.

The coefficient $\beta$ is set to a constant selected from the range of 0.05 to 0.15.

According to this configuration, the conversion can be easily performed.

(6) The sheet thickness of the metal sheet before the forming is set to t [mm], the element type is set to a 2D solid element, a 3D solid element, or a shell element, the first analysis conditions are that the element type is the shell element and the mesh size of an element used for the forming analysis is m [mm], the mesh size of the element in the second analysis conditions is m [mm], and the conversion factor K for converting the stress calculated by the forming analysis under the first analysis conditions into the stress calculated by the forming analysis under the second analysis conditions is expressed by Equation (2) below, $$K=1/(\alpha[\beta(m/t)+1]) \tag{2}.$$

The coefficient $\alpha$ is set to a constant selected from the range of 0.7 to 0.9 when the element type of the second analysis conditions is the 2D solid element, and is set to 1 when the element type of the second analysis conditions is the 3D solid element or the shell element.

The coefficient $\beta$ is set to a constant selected from the range of 0.05 to 0.15.

According to this configuration, the conversion can be easily performed.

(7) The forming analysis is the forming analysis by the finite element method, and, with respect to the stress output location in the shape after the forming or the integration point position where the stress is output in the case of the shell element in the forming analysis under the first analysis conditions and the second analysis conditions, the maximum stress in all of the elements or the integration points in the sheet thickness is output.

According to this configuration, the accuracy of the maximum residual stress obtained by the forming analysis is enhanced by considering the stress values at all of the output points in the sheet thickness direction.

(8) The metal sheet is a high-tensile steel sheet having a tensile strength of 980 MPa or more.

(9) The intended formed article is a constituent component of an automobile.

(10) A program used for a delayed fracture characteristic evaluation method includes: a first step of applying a deformation to a test piece containing a metal sheet, evaluating the generation status of a crack generated in the test piece by placing the deformed test piece in a hydrogen entry environment, inputting information about the deformation determined to have a delayed fracture by the evaluation, calculating the maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment; a second step of determining a residual stress generated in the formed article by forming the metal sheet into an intended formed article by a forming analysis under second analysis conditions by the computer; and an evaluation step of evaluating the delayed fracture characteristics of the intended formed article from a comparison between the residual stress determined in the second step and the reference stress; in which the conditions of an element type and an element size among the first analysis conditions are set to the same conditions as the conditions of the element type and the element size of the second analysis conditions, the program causing the computer to realize the first step.

(11) A program used for a delayed fracture characteristic evaluation method includes: a first step of applying a deformation to a test piece containing a metal sheet, evaluating the generation status of a crack generated in the test piece by placing the deformed test piece in a hydrogen entry environment, inputting information about the deformation determined to have a delayed fracture by the evaluation, calculating the maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment; a second step of determining a residual stress generated in the formed article by forming the metal sheet into an intended formed article by a forming analysis under second analysis conditions by the computer; a third step of determining, from a correlation between a first stress calculated by the forming analysis under the first analysis conditions and a second stress calculated by the forming analysis under the second analysis conditions when press forming is performed under the same forming condition, a conversion factor for bringing the stress calculated by the forming analysis under the first analysis conditions closer to the stress calculated by the forming analysis under the second analysis conditions; and an evaluation step of evaluating the delayed fracture characteristics of the intended formed article from a comparison between the residual stress determined in the second step and a stress after converting the reference stress by the conversion factor, the program causing the computer to realize the first step and the third step.

EXAMPLES

Next, Examples of this embodiment are described.

Herein, Examples are described for a test material (metal sheet) having a sheet thickness of 1.4 mm. As the test material, a high-tensile steel sheet having a tensile strength of 1520 MPa was used.

First, a bending test step illustrated in FIGS. 9A to 9E was carried out. More specifically, a punch having a V-shape and a bending radius of 7 mm was used.

V-bending was applied to a test material containing a 110 mm×30 mm rectangular flat sheet 1. Thereafter, fastening forming was applied to a test piece with a stress loading jig at a position 22 mm from the sheet edges of both ends sandwiching a bending portion 2A of the test piece. Thus, a test piece 2 to which a residual stress was applied was produced.

Herein, as illustrated in FIG. 9D, the change amount of the distance between two points to which a load is applied by fastening is defined as the fastening amount. The reference numeral 6 designates a fastening tool. The end surface of the test piece was produced by shearing. A fracture surface, which is the side where burrs are generated in the shearing, was set as the outside of the bending in the first V-bending. The inside of the bending in the first V-bending is defined as the sheet front surface, and the outside of the bending is defined as the sheet back surface, thereby defining the front and the back of the sheet.

Two or more of the formed articles were produced by changing the fastening amount in the fastening forming, and immersed in a tank 7 of hydrochloric acid 8 having a pH of 3 for 100 hours for investigating whether cracks were generated. Thus, the limit of the fastening amount at which the delayed fracture occurs was investigated. As a result, it was found that, when the fastening amount is 22 mm or more, the delayed fracture can occur from the sheared end surface.

Thus, the test piece when the fastening amount was 22 mm was defined as a first formed article for determining the reference stress for the occurrence of the delayed fracture as a test piece having the limit stress at which the delayed fracture occurs.

Next, a simulation analysis by a computer was performed using the same V-bending processing as that of the first formed article and fastening forming having the same fastening amount as that of the first formed article as the forming conditions. For the analysis, finite element method software: LS-DYNA ver. 971 was used.

At this time, the following forming analysis was performed to confirm a difference in the calculated stress values depending on the analysis conditions of the element types. More specifically, the forming analysis was performed using the three different types of element types as illustrated in FIGS. 10A to 10C: 2D solid element, 3D solid element, and shell element.

The mesh sizes of the 2D solid element and the 3D solid element were set to 0.1 mm. The mesh size of the shell element was set to 1.4 mm.

Further, to show a difference in the calculated stress values depending on the stress output locations in the first formed article or the integration point positions where the stress is output in the shell element, the following was performed. As illustrated in FIG. 11D, three regions of a region A (within 0.3 mm from the front surface side in the sheet thickness), a region B (region near the center in the sheet thickness) and between the 0.3 mm part from the front surface side in the sheet thickness and a 0.3 mm part from the back surface side in the sheet thickness), and a region C (within 0.3 mm from the back surface side in the sheet thickness) were set in the sheet thickness direction. Then, the maximum stress in each of the three regions was output as the calculated value. FIGS. 11A to 11C are illustrated to specify the front surface and the back surface.

Further, the entire sheet thickness, which is a total of all of the regions A, B, C, was defined as a region D (entire region in the sheet thickness), and the maximum stress of the region D was also output as the calculated value.

However, in the 2D solid element, the meshes of parts included in the regions in the sheet thickness direction were used for outputting the calculated stress values. In the 3D solid element, among the meshes located on the front surface of the sheet end surface, the maximum values of stresses of the meshes in parts included in the regions A, B, C, D in the sheet thickness direction were used for outputting the calculated values. Similarly in the shell element, the meshes located on the front surface of the sheet end surface were targeted, and the maximum values of stresses at the integration points in the parts included in the regions A, B, C, D in the sheet thickness direction were used for outputting the calculated stress values.

Table 1 shows the calculated stress values when the fastening amount is 22 mm in the regions A, B, C, and D for each element type.

TABLE 1

| Element type | Stress evaluation region | | | |
| | A | B | C | D |
|---|---|---|---|---|
| 2D solid | −1814 | 1677 | 1781 | 1781 |
| 3D solid | −887 | 1508 | 1321 | 1508 |
| Shell | −1204 | 1257 | 1316 | 1316 |

Calculated stress value/MPa

As is apparent from Table 1, the region A is compressed by the fastening forming, and therefore the calculated stress values were negative in this case. In the region B, the calculated stress values were positive because a slight tensile stress due to the fastening forming was added to the residual stress after the bending forming. The region C receives the strongest tension by the fastening forming, and therefore calculated stress values were maximum and positive. As a difference depending on the element type, the 2D solid element assumes a plane strain state. Therefore, in the 2D solid element, the absolute values of the calculated stress values were relatively high because the stress increased as compared with a stress state close to a uniaxial tension in the end surface. The 3D solid and the shell element differed in the region where the stress is maximum, and a difference in a stress distribution in the sheet thickness due to a calculation method was observed.

Next, a test piece as a model component was produced from a material blank by press forming, with components actually used in automobiles in mind. This test piece was defined as a second formed article.

For the second formed article, the same material as that of the first formed article was used. The outer periphery of the material blank was produced by shearing. In the shearing, a fracture surface on the side where burrs occur is defined as the sheet front surface and the opposite side is defined as the sheet back surface in the sheet thickness direction, thereby defining the front and the back of the sheet.

The second formed article was also investigated for the presence or absence of the occurrence of the delayed fracture in various parts of the formed article by immersing the same in hydrochloric acid having a pH of 3 for 100 hours and investigating the generation of cracks in the same manner as the first formed article.

Next, the second formed article was subjected to a forming analysis using a shell element such as is used in a forming analysis of the actual automobile component, and stresses were calculated in all regions of the component. In this example, the mesh size of the shell element was set to 1.4 mm.

Next, from the second formed article, 14 representative locations were selected, including locations where the delayed fracture occurred. The selected 14 locations were designated as a delayed fracture predicted site 1 to a delayed fracture predicted site 14. The calculated stress values were output from the calculation results for the delayed fracture predicted sites. As with the first test piece above, with the mesh located on the sheet end surface as the target, the maximum values of stresses at the integration points of parts included in the regions A, B, C, D in the sheet thickness direction were used for outputting the calculated values.

Table 2 shows the calculated stress values in the regions A, B, C, D and the presence or absence of the delayed fracture in the regions in the delayed fracture predicted site 1 to the delayed fracture predicted site 14 of the second formed article.

TABLE 2

| Delayed fracture predictedsite No. | Stress evaluation region | | | | Occurrence of delayed fracture |
|---|---|---|---|---|---|
| | A | B | C | D | |
| 1 | 1854 | 1784 | −1687 | 1854 | Occurred |
| 2 | 1470 | 1154 | −867 | 1470 | Occurred |
| 3 | 1295 | 1120 | −753 | 1295 | Not occurred |
| 4 | 1047 | 965 | −541 | 1047 | Not occurred |
| 5 | −1617 | 1742 | 1741 | 1742 | Occurred |
| 6 | −498 | 1187 | 1537 | 1537 | Occurred |
| 7 | −514 | 1028 | 945 | 1028 | Not occurred |
| 8 | −897 | 857 | 873 | 873 | Not occurred |
| 9 | 253 | 1125 | −547 | 1125 | Not occurred |
| 10 | 542 | 1548 | −302 | 1548 | Occurred |
| 11 | −547 | −741 | −654 | 11 | Not occurred |
| 12 | 847 | 945 | 893 | 945 | Not occurred |
| 13 | 1187 | 1059 | 1042 | 1187 | Not occurred |
| 14 | 1420 | 1389 | 1475 | 1475 | Occurred |

Calculated stress value/MPa

Each delayed fracture predicted site had various stress distributions in the sheet thickness direction, depending on the forming mode in the forming, a bending forming strain, a bending direction, a degree of springback, and the like. Therefore, the calculated stress values greatly differed depending on the selection of the stress output region.

Figure 12:
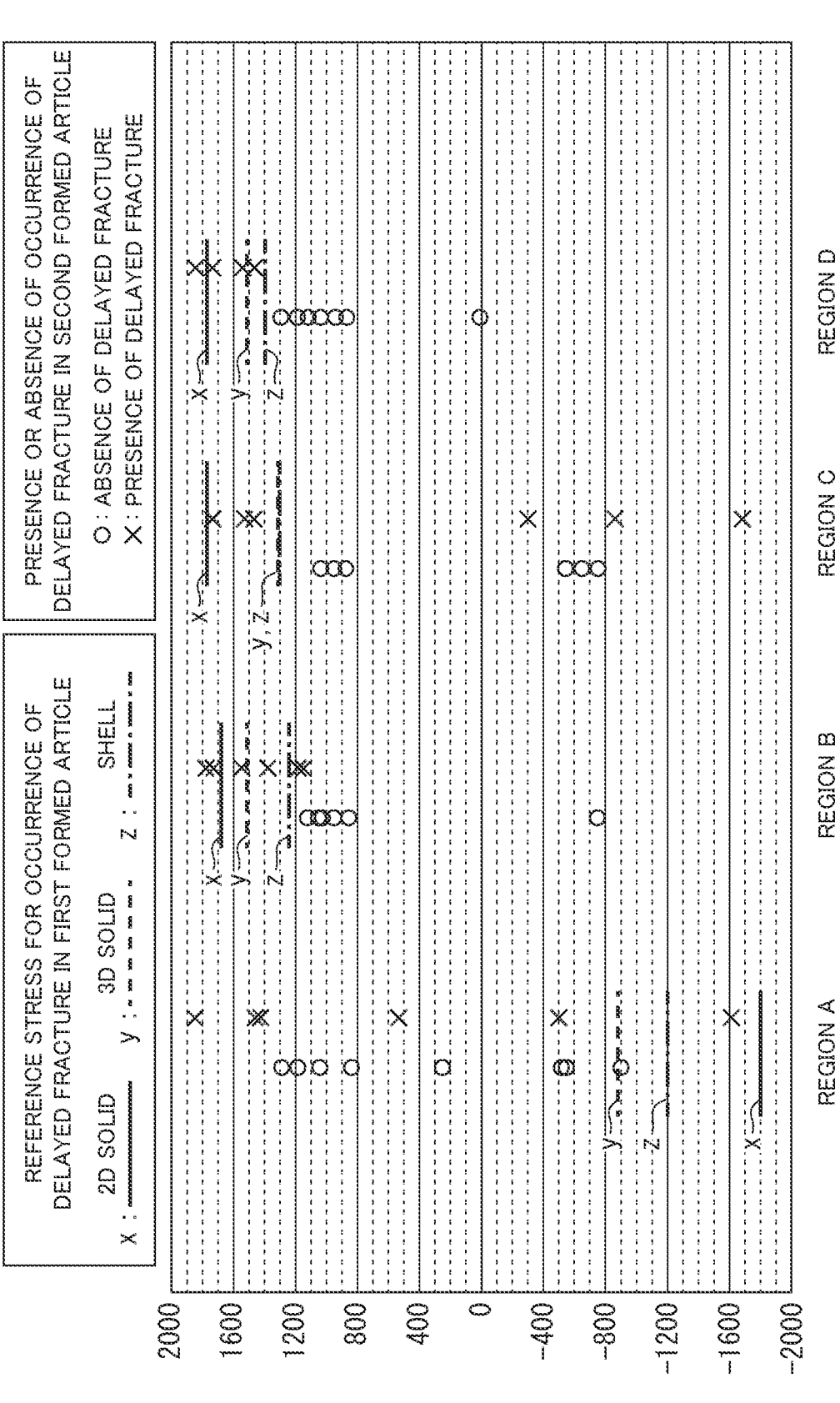
FIG. 12 is a view in which the calculated stresses in three different element types in a first formed article are illustrated for each calculation region and the stresses in a second formed article are illustrated together with the presence or absence of a delayed fracture for comparison.

Finally, the reference stress for the occurrence of the delayed fracture is shown for each region used for the calculation as illustrated in FIG. 12. The reference stress for the occurrence of the delayed fracture was calculated in the first formed article by the forming analysis in three different factors of the 2D solid element, the 3D solid element, and the shell element, and determined by the output of the calculated stress value in each of the regions A, B, C, D.

FIG. 12 also illustrates the outputs of the calculated stress values in each of the regions A, B, C, D calculated from the forming analysis in the shell element in the second formed article. The outputs of the calculated values were illustrated for each region used for the calculation together with the presence or absence of the delayed fracture.

As is apparent from FIG. 12, the stress used for determining the delayed fracture greatly changes depending on the region used for outputting the calculated stress values. When the maximum value of the stresses in all of the regions is used, the prediction of the delayed fracture is not affected by the fact that the stress distribution in the second formed article is different from that in the first formed article. This enables the prediction of the delayed fracture with the highest accuracy.

Next, attention is focused on the element type used for the forming analysis. In this case, when the 2D solid element is used for the forming analysis of the first formed article, the stress is overestimated because the plane strain state was assumed. As a result, the stress at which the delayed fracture occurs cannot be accurately predicted in the second formed article. On the other hand, when the shell element is used for the forming analysis of the first formed article, it becomes possible to predict the delayed fracture with the highest accuracy. When the 3D solid element was used for the forming analysis of the first formed article, the accuracy of the prediction of the delayed fracture was lower than that when the 3D shell was used. The reason therefor is as follows. The calculation by a fine mesh of the 3D solid enables the calculation of the stress with relatively higher accuracy than that of the 3D shell. On the other hand, the increase in the calculation accuracy conversely caused a deviation from the calculated value in the 3D shell, which is a practical condition.

Thus, it is desirable to make the analysis conditions of the first formed article and the second formed article as close as possible. It is found that it is preferable to completely match the element type and the mesh size.

Further, as an example of simple analysis condition adjustment using the conversion factor, the effect of the adjustment of the delayed fracture reference stress by the conversion factor was confirmed.

Table 3 shows a case where the calculated stress values of the 2D solid and the 3D solid in Table 1 was converted to the stress of the shell element by Equation (1).

TABLE 3

| Conversion factor K | Element type | Stress evaluation region | | | |
|---|---|---|---|---|---|
| | | A | B | C | D |
| 0.73 | 2D solid | −1316 | 1217 | 1292 | 1292 |
| 0.91 | 3D solid | −805 | 1368 | 1198 | 1368 |
| Reference | Shell | −1204 | 1257 | 1316 | 1316 |

Calculated stress value/MPa

In Equation (1), σ is the pressure value after the conversion, which is the calculated stress when converted to the shell element as the reference. m is the mesh size. t is a sheet thickness of 1.4 mm.

Herein, the coefficient α was set to 0.8 for the 2D solid element and was set to 1 for the 3D solid element and the shell element. The coefficient β was set to 0.1. σ0 is the reference stress before the conversion of the delayed fracture calculated in each of the elements.

Figure 13:
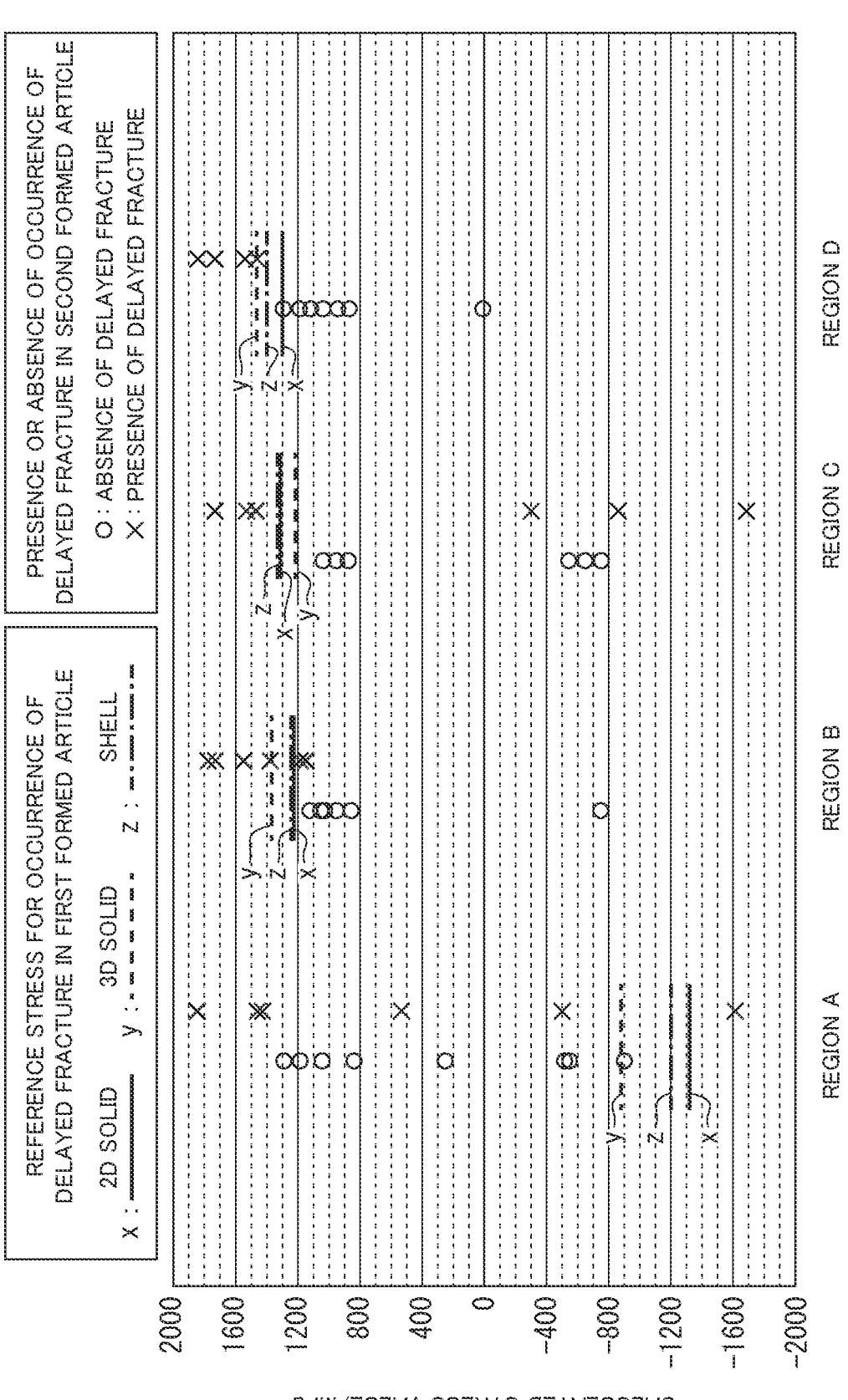
FIG. 13 is a view illustrating a case where the calculated stresses (reference stresses) in three different element types in the first formed article in FIG. 12 are corrected by conversion factors depending on the element types.

FIG. 13 illustrates the reference stress GO for the occurrence of the delayed fracture replaced by the value σ after the conversion (correction) by the conversion factor in Table 3. The reference stress σ0 is a value calculated by the forming analysis in the three different elements of the 2D solid element, the 3D solid element, and the shell element for the first formed article in FIG. 12, and is determined by the outputs of the calculated stress values in each of the regions A, B, C, D.

As is apparent from FIG. 13, a difference in the calculated stresses depending on the element type was reduced by the simple correction by the conversion factor in Equation (1). Then, it was found that the occurrence of the delayed fracture can be simply predicted with high accuracy even when the calculation is not performed for each different forming analysis condition.

As described above, the present invention has made it possible to evaluate the delayed fracture characteristics considering the difference depending on the analysis conditions of the forming analysis. Thus, it becomes possible to apply the reference value of the stress serving as the limit of the occurrence of the delayed fracture determined by various delayed fracture evaluation methods to the calculation result of the forming analysis of the actual automobile component. As a result, it has become possible to predict the occurrence of the delayed fracture in advance from the forming analysis.

REFERENCE SIGNS LIST 1 test piece
9 test step
10 reference stress calculation step (first step)
11 evaluation stress calculation step (second step)
12 evaluation step
13 conversion factor setting step (third step)
21 computer
22 program storage unit
23A first step program
23B second step program
23C evaluation step program
23E third step program
24 conversion factor

The invention claimed is:

1. A delayed fracture characteristic evaluation method comprising:
   a test step of applying a deformation to a test piece containing a metal sheet, and evaluating a generation status of a crack generated in the test piece by placing the deformed test piece in a hydrogen entry environment,
   a first step of calculating, for the deformation determined to have a delayed fracture based on the evaluation, a maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment;
   a second step of determining a residual stress generated in the formed article by forming the metal sheet into an intended formed article by a forming analysis under second analysis conditions by the computer;
   a third step of determining, from a correlation between a first stress calculated by the forming analysis under the first analysis conditions and a second stress calculated by the forming analysis under the second analysis conditions when press forming is performed under a same forming condition, a conversion factor for bringing the stress calculated by the forming analysis under the first analysis conditions closer to the stress calculated by the forming analysis under the second analysis conditions; and
   an evaluation step of evaluating a delayed fracture characteristic of the intended formed article from a comparison between the residual stress determined in the second step and a stress after converting the reference stress by the conversion factor.

2. The delayed fracture characteristic evaluation method according to claim 1, wherein the forming analysis is a forming analysis by a finite element method, and the first analysis conditions and the second analysis conditions include one or more conditions selected from an element type, an element size, a stress output location in the formed article, and an integration point position where the stress is output in a shell element.

3. The delayed fracture characteristic evaluation method according to claim 2,
   the first analysis conditions and the second analysis conditions including the element type, the method comprising:
   setting the conversion factor based on a difference between the element types of the first analysis conditions and the second analysis conditions.

4. The delayed fracture characteristic evaluation method according to claim 3, wherein
   a sheet thickness of the metal sheet before the forming is set to t [mm], the element type is set to a 2D solid element, a 3D solid element, or a shell element,
   the second analysis conditions are that the element type is the shell element and a mesh size of an element used for the forming analysis is m [mm],
   a mesh size of an element in the first analysis conditions is m [mm], and
   the conversion factor K for converting the stress calculated by the forming analysis under the first analysis conditions into the stress calculated by the forming analysis under the second analysis conditions is expressed by Equation (1) below, $$K=\alpha[\beta(m/t)+1] \qquad (1),$$

wherein
   a coefficient $\alpha$ is set to a constant selected from a range of 0.7 to 0.9 when the element type of the first analysis conditions is the 2D solid element, and is set to 1 when the element type of the first analysis conditions is the 3D solid element or the shell element, and
   a coefficient $\beta$ is set to a constant selected from a range of 0.05 to 0.15.

5. The delayed fracture characteristic evaluation method according to claim 4, wherein
   the forming analysis is the forming analysis by the finite element method, and
   with respect to the stress output location in a shape after the forming or the integration point position where the stress is output in the case of the shell element in the forming analysis under the first analysis conditions and the second analysis conditions, a maximum stress in all of the elements or the integration points in the sheet thickness is output.

6. The delayed fracture characteristic evaluation method according to claim 3, wherein a sheet thickness of the metal sheet before the forming is set to t [mm], the element type is set to a 2D solid element, a 3D solid element, or a shell element, the first analysis conditions are that the element type is the shell element and a mesh size of an element used for the forming analysis is m [mm], a mesh size of an element in the second analysis conditions is m [mm], and the conversion factor K for converting the stress calculated by the forming analysis under the first analysis conditions into the stress calculated by the forming analysis under the second analysis conditions is expressed by Equation (2) below, $$K=1/(\alpha[\beta(m/t)+1])\qquad(2),$$

wherein a coefficient $\alpha$ is set to a constant selected from a range of 0.7 to 0.9 when the element type of the second analysis conditions is the 2D solid element, and is set to 1 when the element type of the second analysis conditions is the 3D solid element or the shell element, and a coefficient $\beta$ is set to a constant selected from a range of 0.05 to 0.15.

7. The delayed fracture characteristic evaluation method according to claim 3, wherein the forming analysis is the forming analysis by the finite element method, and with respect to the stress output location in a shape after the forming or the integration point position where the stress is output in the case of the shell element in the forming analysis under the first analysis conditions and the second analysis conditions, a maximum stress in all of the elements or the integration points in the sheet thickness is output.

8. The delayed fracture characteristic evaluation method according to claim 2, wherein the forming analysis is the forming analysis by the finite element method, and with respect to the stress output location in a shape after the forming or the integration point position where the stress is output in the case of the shell element in the forming analysis under the first analysis conditions and the second analysis conditions, a maximum stress in all of the elements or the integration points in the sheet thickness is output.

9. The delayed fracture characteristic evaluation method according to claim 1, wherein the metal sheet is a high-tensile steel sheet having a tensile strength of 980 MPa or more.

10. The delayed fracture characteristic evaluation method according to claim 1, wherein the intended formed article is a constituent component of an automobile.

11. The delayed fracture characteristic evaluation method according to claim 1, wherein the forming analysis is the forming analysis by the finite element method, and with respect to the stress output location in a shape after the forming or the integration point position where the stress is output in the case of the shell element in the forming analysis under the first analysis conditions and the second analysis conditions, a maximum stress in all of the elements or the integration points in the sheet thickness is output.

12. A non-transitory computer-readable medium storing a computer program thereon, the program configured to perform a delayed fracture characteristic evaluation method comprising:

a test step of receiving test data obtained from applying a deformation to a test piece containing a metal sheet, and evaluating a generation status of a crack generated in the test piece by placing the deformed test piece in a hydrogen entry environment, a first step of inputting information about the deformation determined to have a delayed fracture by the evaluation, calculating a maximum residual stress generated in the test piece after the deformation by applying the deformation to the test piece by a forming analysis under first analysis conditions by a computer, and determining, from the calculated maximum residual stress, a reference stress for determining whether the delayed fracture occurs in a formed article of the metal sheet in a hydrogen environment;

a second step of determining a residual stress generated in the formed article by forming the metal sheet into an intended formed article by a forming analysis under second analysis conditions by the computer;

a third step of determining, from a correlation between a first stress calculated by the forming analysis under the first analysis conditions and a second stress calculated by the forming analysis under the second analysis conditions when press forming is performed under a same forming condition, a conversion factor for bringing the stress calculated by the forming analysis under the first analysis conditions closer to the stress calculated by the forming analysis under the second analysis conditions; and an evaluation step of evaluating the delayed fracture characteristics of the intended formed article from a comparison between the residual stress determined in the second step and a stress after converting the reference stress by the conversion factor, the program causing the computer to realize the first step and the third step.

13. The non-transitory computer-readable medium storing the program according to claim 12, wherein the forming analysis is a forming analysis by a finite element method, and the first analysis conditions and the second analysis conditions include one or more conditions selected from an element type, an element size, a stress output location in the formed article, and an integration point position where the stress is output in a shell element.

14. The non-transitory computer-readable medium storing the program according to claim 13, the first analysis conditions and the second analysis conditions including the element type, the program comprising:

setting the conversion factor based on a difference between the element types of the first analysis conditions and the second analysis conditions.

15. The non-transitory computer-readable medium storing the program according to claim 14, wherein a sheet thickness of the metal sheet before the forming is set to t [mm], the element type is set to a 2D solid element, a 3D solid element, or a shell element, the second analysis conditions are that the element type is the shell element and a mesh size of an element used for the forming analysis is m [mm], a mesh size of an element in the first analysis conditions is m [mm], and the conversion factor K for converting the stress calculated by the forming analysis under the first analysis conditions into the stress calculated by the forming analysis under the second analysis conditions is expressed by Equation (1) below, $$K=\alpha[\beta(m/t)+1] \tag{1},$$

wherein a coefficient $\alpha$ is set to a constant selected from a range of 0.7 to 0.9 when the element type of the first analysis conditions is the 2D solid element, and is set to 1 when the element type of the first analysis conditions is the 3D solid element or the shell element, and a coefficient $\beta$ is set to a constant selected from a range of 0.05 to 0.15.

16. The non-transitory computer-readable medium storing the program according to claim 14, wherein a sheet thickness of the metal sheet before the forming is set to t [mm], the element type is set to a 2D solid element, a 3D solid element, or a shell element, the first analysis conditions are that the element type is the shell element and a mesh size of an element used for the forming analysis is m [mm], a mesh size of an element in the second analysis conditions is m [mm], and the conversion factor K for converting the stress calculated by the forming analysis under the first analysis conditions into the stress calculated by the forming analysis under the second analysis conditions is expressed by Equation (2) below, $$K=1/(\alpha[\beta(m/t)+1]) \tag{2},$$

wherein a coefficient $\alpha$ is set to a constant selected from a range of 0.7 to 0.9 when the element type of the second analysis conditions is the 2D solid element, and is set to 1 when the element type of the second analysis conditions is the 3D solid element or the shell element, and a coefficient $\beta$ is set to a constant selected from a range of 0.05 to 0.15.

17. The non-transitory computer-readable medium storing the program according to claim 12, wherein the forming analysis is the forming analysis by the finite element method, and for the stress output location in a shape after the forming or the integration point position where the stress is output in the case of the shell element in the forming analysis under the first analysis conditions and the second analysis conditions, a maximum stress in all of the elements or the integration points in the sheet thickness is output.

* * * * *